F. F. BRUCKER.
VALVE FISHING TOOL.
APPLICATION FILED APR. 8, 1919.
1,308,219.
Patented July 1, 1919.
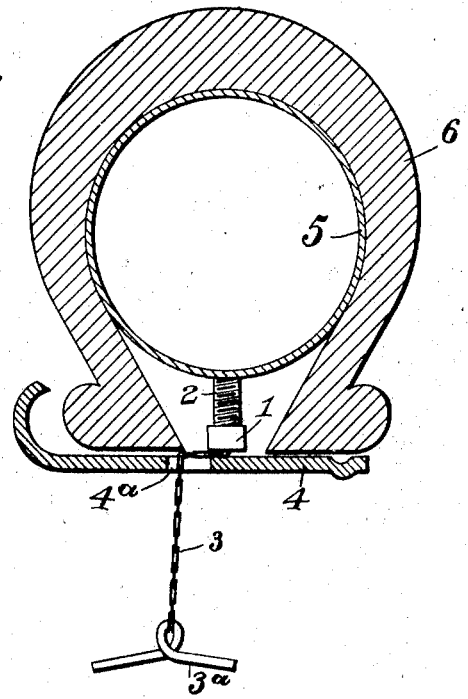
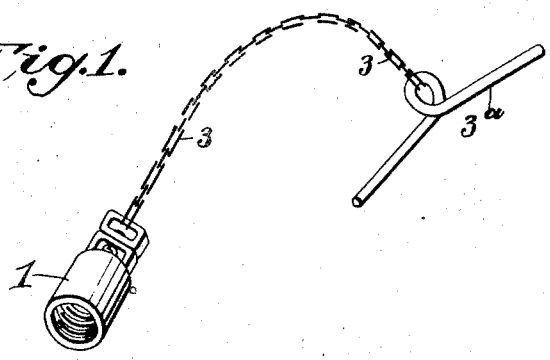
Inventor:
Ferdinand F. Brucker
By Middleton Donaldson Hall
Att'ys.

UNITED STATES PATENT OFFICE.

FERDINAND FRANCIS BRUCKER, OF AKRON, OHIO.

VALVE-FISHING TOOL.

1,308,219.   Specification of Letters Patent.   Patented July 1, 1919.

Application filed April 8, 1919. Serial No. 288,553.

*To all whom it may concern:*

Be it known that I, FERDINAND F. BRUCKER, a citizen of the United States, and resident of Akron, Ohio, have invented certain new and useful Improvements in Valve-Fishing Tools, of which the following is a specification.

My present invention relates to an improved device for use in the placing of tires upon demountable rims.

In the mounting of the ordinary double tube tire on demountable rims of the type having a removable flange on one side the tube is placed inside the tire shoe or casing, and the latter is then slipped onto the rim after which the removable flange is secured in place to hold the tire in position. In the smaller sizes of tires heretofore used it has been possible to first enter the valve stem in the hole provided therefor in the rim and thereafter force the balance of the tire over the rim, the tire at the time the valve stem is entered in the hole lying in a plane diagonal to the plane of the rim. In the larger size of tires now manufactured, and particularly those for truck purposes the base of the tire is so wide and the tire is made so close to the diameter of the rim that it is impossible to apply the tire to the rim without keeping the plane of the tire parallel to the plane of the rim and sliding the tire on in an axial direction. To permit this movement it is necessary to push the valve stem completely into the casing, and after the casing is in place great difficulty is experienced in finding the valve stem and getting it out through the hole in the rim.

The present invention aims to remove this difficulty and comprises the novel construction hereinafter described and defined by the appended claims.

In the accompanying drawings:

Figure 1 is a view of the preferred embodiment of my invention, and

Fig. 2 is a transverse sectional view through a rim showing the tire as partly mounted thereon to illustrate the manner of use of my device.

Referring to this drawing by reference characters 1 designates a screw cap or coupling member, which is designed to be screwed upon the valve stem 2 after the ordinary valve cap has been removed. To this cap 1 is secured, preferably by a swivel connection, a flexible element which may conveniently be made in the form of a flat link chain 3 of a width which will permit its being passed through the hole 4ª in the rim 4. The other end of the flexible element is preferably provided with means, such as a cross bar 3ª which may be passed through the hole and turned crosswise of the chain to prevent accidental pulling out of the chain.

In the use of my device the cap or coupling is applied to the valve stem 2, after the inner tube 5 has been placed in the tire or casing 6, and the valve stem is then pushed up into the casing. The chain 3 is then passed through the hole in the rim, as above described and the tire slid in an axial direction onto the rim, the chain lying between the tire base and rim and being of a thickness which does not interfere with the movement. After the tire is completely on the rim a pull upon the chain draws the valve stem through the hole in the rim when the coupling element may be unscrewed and the device removed.

What I claim is:

1. A device for use in mounting tires on rims comprising a flexible element having at one end means for attachment to a valve stem.

2. A device for use in mounting tires on rims comprising a flexible element adapted to be passed through the hole in the rim and having means at one end for attachment to the valve stem and having at the other end means for preventing accidental withdrawal of the flexible element from the hole in the rim.

3. A device for mounting tires on rims comprising a flat link chain adapted to be passed through the hole in the rim and having means at one end for attachment to the valve stem.

4. A device for mounting tires on rims comprising a flat flexible element adapted to be passed through the hole the rim and a screw coupling member adapted to be screwed on the valve stem and having a swivel connection with the flexible element.

5. A device for mounting tires on rims comprising a flexible element having at one ends means for attachment to the valve stem and at the other end a cross bar.

In testimony whereof I affix my signature.

FERDINAND FRANCIS BRUCKER.